United States Patent
Nakai

(10) Patent No.: US 9,959,635 B2
(45) Date of Patent: May 1, 2018

(54) STATE DETERMINATION DEVICE, EYE CLOSURE DETERMINATION DEVICE, STATE DETERMINATION METHOD, AND STORAGE MEDIUM

(71) Applicant: Panasonic Intellectual Property Management Co., Ltd., Osaka (JP)

(72) Inventor: Wataru Nakai, Tokyo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days. days.

(21) Appl. No.: 15/243,823

(22) Filed: Aug. 22, 2016

(65) Prior Publication Data

US 2017/0091955 A1 Mar. 30, 2017

(30) Foreign Application Priority Data

Sep. 30, 2015 (JP) .................................. 2015-193177

(51) Int. Cl.
*G06K 9/00* (2006.01)
*G06T 7/90* (2017.01)
(Continued)

(52) U.S. Cl.
CPC ................ *G06T 7/90* (2017.01); *G08B 21/06* (2013.01); *H04N 5/23219* (2013.01); *G06T 2207/10024* (2013.01); *G06T 2207/30201* (2013.01)

(58) Field of Classification Search
CPC . G06T 2207/10024; G06T 2207/30201; G06T 7/408; G06B 21/06; H04N 5/23219; G06K 9/00791
See application file for complete search history.

(56) References Cited

U.S. PATENT DOCUMENTS 8,224,035 B2 * 7/2012 Adachi ............. G06K 9/00604
351/206
9,182,816 B2 * 11/2015 Kasahara ............. G06F 3/0487
(Continued)

FOREIGN PATENT DOCUMENTS

EP 2351524 8/2011
JP 2002-264692 9/2002
(Continued)

OTHER PUBLICATIONS

The Extended European Search Report dated Dec. 7, 2016 for the related European Patent Application No. 16186322.0.

*Primary Examiner* — Iman K Kholdebarin
(74) *Attorney, Agent, or Firm* — Greenblum & Bernstein, P.L.C.

(57) ABSTRACT

A state determination device includes a calculator that receives multiple eye region images captured at different timings in a time interval from when a person opening eyes closes the eyes to when the person opens the eyes next and calculates a luminance value relating to multiple pixels included in each of the eye region images and a determiner, wherein the determiner calculates a time interval from a first time point when the luminance value relating to the pixels reaches a predetermined first luminance value for the first time to a second time point when the luminance value relating to the pixels reaches a second luminance value after the first time point; if a time interval from the first time point to the second time point is a first time interval, the determiner determines that the person is in a first state; if the time interval from the first time point to the second time point is a second time interval which is shorter than the first time interval, the determiner determines that the person is in a second state which differs from the first state; and the determiner outputs a determination result.

16 Claims, 7 Drawing Sheets

(51) Int. Cl.
G08B 21/06 (2006.01)
H04N 5/232 (2006.01)

(56) References Cited

U.S. PATENT DOCUMENTS

| | | | | |
|---|---|---|---|---|
| 2006/0210121 A1* | 9/2006 | Nakano | ................ | G06K 9/0061 |
| | | | | 382/117 |
| 2009/0016574 A1* | 1/2009 | Tsukahara | .............. | A61B 5/117 |
| | | | | 382/117 |
| 2016/0004303 A1* | 1/2016 | Arar | ........................ | G06F 3/013 |
| | | | | 345/156 |

FOREIGN PATENT DOCUMENTS

| | | |
|---|---|---|
| JP | 2004-341954 | 12/2004 |
| TW | 201140511 | 11/2011 |

* cited by examiner

STATE DETERMINATION DEVICE, EYE CLOSURE DETERMINATION DEVICE, STATE DETERMINATION METHOD, AND STORAGE MEDIUM

BACKGROUND

1. Technical Field

The present disclosure relates to a state determination device, an eye closure determination device, a state determination method, and a storage medium.

2. Description of the Related Art

A technology that detects whether the eyes of a person are open or closed, using an image including an eye of the person (hereinafter referred to as an "eye region image") has been known in recent years.

For example, Japanese Unexamined Patent Application Publication No. 2002-264692 discloses a device that calculates a one-dimensional edge image indicating changes in the gray level of the pixels in an eye region image, detects the boundary between an upper eyelid and an eyeball and the boundary between an lower eyelid and the eyeball on the basis of the gray-level changes in the one-dimensional edge image, and detects whether the eyes of the person are open or closed, on the basis of the distance between the detected boundaries. This device processes the one-dimensional edge image using the gray-level changes without having to binarize the edge image and thus is less likely to be affected by the illumination condition or individual differences, such as those among the facial structures of persons.

SUMMARY

However, an eye region image includes many edges other than the boundary between an eyelid and an eyeball, including an eyelash. For this reason, the device disclosed in Japanese Unexamined Patent Application Publication No. 2002-264692 is more likely to erroneously detect the boundary between an eyelid and an eyeball and thus to erroneously detect that the eyes are open or closed.

One non-limiting and exemplary embodiment provides a state determination device that accurately determines the state of a person using an eye region image, an eye closure determination device, a state determination method, a state determination program, and a storage medium.

In one general aspect, the techniques disclosed here feature a state determination device including a calculator that receives multiple eye region images captured at different timings in a time interval from when a person opening eyes closes the eyes to when the person opens the eyes next and calculates a luminance value relating to multiple pixels included in each of the eye region images and a determination unit, wherein the determination unit calculates a time interval from a first time point when the luminance value relating to the pixels reaches a predetermined first luminance value for the first time to a second time point when the luminance value relating to the pixels reaches a second luminance value after the first time point; if a time interval from the first time point to the second time point is a first time interval, the determination unit determines that the person is in a first state; if the time interval from the first time point to the second time point is a second time interval which is shorter than the first time interval, the determination unit determines that the person is in a second state which differs from the first state; and the determination unit outputs a determination result.

It should be noted that general or specific embodiments may be implemented as a system, a method, an integrated circuit, a computer program, a storage medium, or any selective combination thereof.

According to the present disclosure, the state of a person can be accurately determined using an eye region image.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Now, embodiments of the present disclosure will be described in detail with reference to the accompanying drawings. Note that elements having the same functions in the respective embodiments are given the same reference signs and will not be described repeatedly.

First Embodiment

Figure 1:
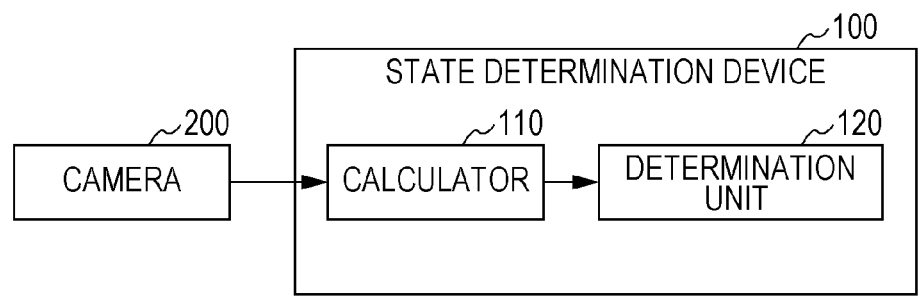
FIG. 1 is a block diagram showing an example configuration of a state determination device according to a first embodiment of the present disclosure.

First, an example configuration of a state determination device 100 according to a first embodiment of the present disclosure will be described with reference to FIG. 1. FIG. 1 is a block diagram showing an example configuration of the state determination device 100 according to the first embodiment of the present disclosure.

As shown in FIG. 1, the state determination device 100 is connected to a camera 200 and includes a calculator 110 and a determination unit (determiner) 120.

Figure 2:
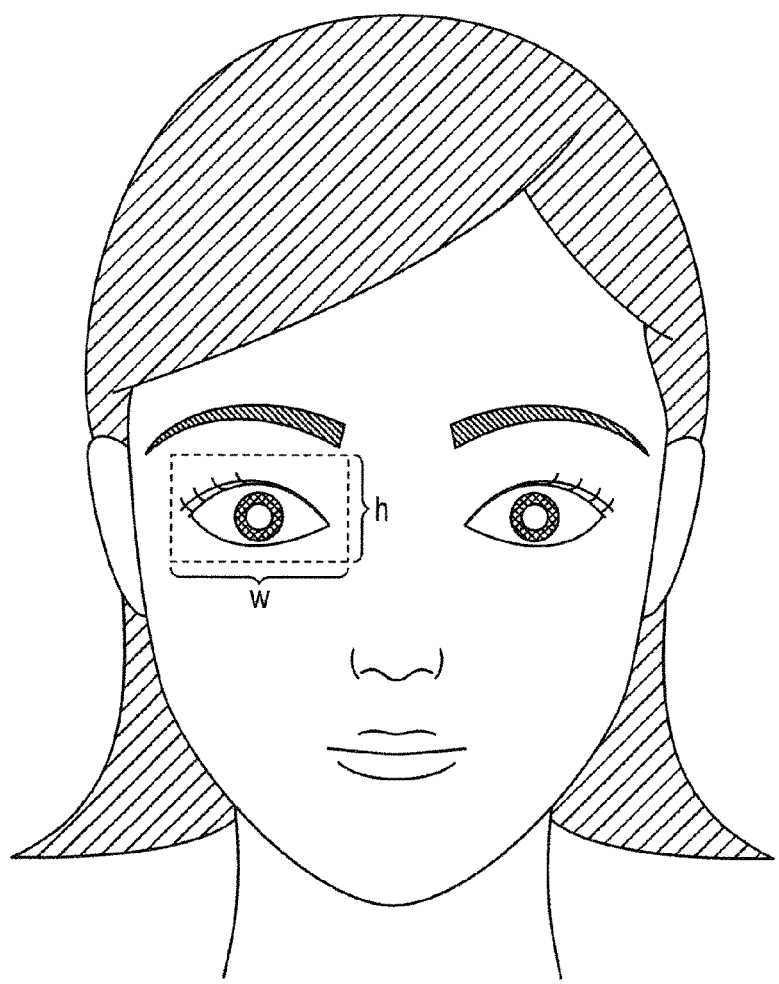
FIG. 2 is a block diagram showing an example of an eye region image according to a first embodiment of the present disclosure.

The camera 200 captures images of an eye region including an eye of a person at different timings in a predetermined time interval. As used herein, the "predetermined time interval" refers to a time interval from when the person opening the eyes closes the eyes to when the person opens the eyes next. The "eye region" refers to, for example, a rectangular region having a height corresponding to h number of pixels and a width corresponding to w number of pixels, as shown in FIG. 2.

The camera 200 sequentially outputs the captured image of the eye region (hereinafter referred to as an "eye region image") and image capture time point information indicating the time point when the eye region image has been captured (hereinafter referred to as an "image capture time point" or "image capture timing") to the calculator 110.

Each time it receives an eye region image from the camera 200, the calculator 110 calculates the average of the luminance values of multiple pixels included in the eye region image (hereinafter referred to as an "average luminance value"; an example of a luminance value relating to multiple pixels). For example, the calculator 110 calculates the average luminance value by Formula (1) below. In Formula (1), lumi(x,y) represents the luminance of a pixel at coordinates (x,y) of the eye region image; w represents the width [pixel] of the eye region image; and h represents the height [pixel] of the eye region image.

$$\text{mean\_lumi} = \sum_{x=0}^{w-1} \sum_{y=0}^{h-1} \frac{lumi(x, y)}{w * h} \qquad (1)$$

An eye region image indicating a state in which an eye is open (hereinafter referred to as an "eye-open state") has a greater pupil/iris area and a smaller eyelid area than an eye region image indicating a state in which an eye is closed (hereinafter referred to as an "eye-closed state"). Accordingly, if the luminance of the eyelid region is higher than that of the pupil/iris region, an average luminance value calculated on the basis of an eye region image indicating an eye-open state is smaller than that calculated on the basis of an eye region image indicating an eye-closed state. On the other hand, an eye region image indicating an eye-closed state has a smaller pupil/iris area and a greater eyelid area than an eye region image indicating an eye-open state. Accordingly, an average luminance value calculated on the basis of an eye region image indicating an eye-closed state is greater than that calculated on the basis of an eye region image indicating an eye-open state.

Note that the average luminance value need not be a simple average and may be, for example, an arithmetic mean, a geometric mean, a harmonic mean, or weighted mean. A median, mode, or the like may be used instead of the average. Since these types of values are called representative values in statistics, "a luminance value relating to multiple pixels" can be referred to as "a representative value of the luminances of multiple pixels" (the same applies to second and third embodiments below).

The calculator 110 then sequentially outputs the calculated average luminance value and the image capture time point information corresponding to the average luminance value (the image capture time point information received from the camera 200 along with the eye region image used to calculate the average luminance value) to the determination unit 120.

The determination unit 120 calculates an eye-closed time and determines whether the person is in a low-awakening state (a strong-drowsiness state) or in a high-awakening state (a weak-drowsiness state), on the basis of the length of the eye-closed time. The term "eye-closed time" refers to a time from when a person opening eyes closes the eyes to when the person opens the eyes again. A process performed by the determination unit 120 will be described specifically below.

First, the determination unit 120 receives an average luminance value and corresponding image capture time point information from the calculator 110. The determination unit 120 then determines whether the start timing of an eye-closed time (hereinafter may be simply referred to as the "start timing") has been already stored. The start timing is, for example, a timing indicated by image capture time point information when the received average luminance value is equal to or greater than a predetermined first luminance value (to be discussed in detail later).

A case in which the start timing has been already stored will be described later.

If the start timing has yet to be stored, the determination unit 120 determines whether the average luminance value received from the calculator 110 is equal to or greater than the predetermined first luminance value. As used herein, the "first luminance value" refers to, for example, the luminance value of an eye region of a person who is typically deemed to be in an eye-closed state, and is obtained by an experiment or the like.

If the average luminance value is not equal to or greater than the first luminance value, the determination unit 120 receives a subsequent average luminance value and corresponding image capture time point information from the calculator 110 and determines whether the average luminance value is equal to or greater than the first luminance value.

The determination unit 120 repeatedly receives an average luminance value and corresponding image capture time point information from the calculator 110 and determines whether the average luminance value is equal to or greater than the first luminance value until an average luminance value from the calculator 110 becomes equal to or greater than the first luminance value.

If an average luminance value is equal to or greater than the first luminance value, the determination unit 120 stores a timing indicated by image capture time point information received along with the average luminance value in a predetermined storage device as the start timing of an eye-closed time. In this way, the start timing is stored.

After storing the start timing, the determination unit 120 receives a subsequent average luminance value and corresponding image capture time point information from the calculator 110 and determines whether the average luminance value is equal to or smaller than a second luminance value. As used herein, the "second luminance value" refers to, for example, the luminance value of an eye region of a person who is typically deemed to be in an eye-closed state, and is obtained by an experiment or the like. In the present embodiment, it is assumed that the first luminance value and second luminance value are the same value.

If the average luminance value is not equal to or smaller than the second luminance value, the determination unit 120 receives a subsequent average luminance value and corresponding image capture time point information from the calculator 110 and determines whether the average luminance value is equal to or smaller than the second luminance value.

The determination unit 120 repeatedly receives an average luminance value and corresponding image capture time point information from the calculator 110 and determines whether the average luminance value is equal to or smaller than the second luminance value, until an average luminance value from the calculator 110 becomes equal to or smaller than the second luminance value.

If an average luminance value is equal to or smaller than the second luminance value, the determination unit 120 stores a timing indicated by image capture time point information received along with the average luminance value in the predetermined storage device as the end timing of the eye-closed time (hereinafter may be simply referred to as the "end timing").

The determination unit 120 then reads the start timing and end timing stored in the predetermined storage device and calculates the difference therebetween as an eye-closed time. The term "eye-closed time" refers to an time interval from the time point when the average luminance value reaches the first luminance volume for the first time (hereinafter referred to as "the first time point") to the time point when the average luminance value reaches the second luminance value after the first time point (hereinafter referred to as "the second time point").

The determination unit 120 then determines whether the eye-closed time is equal to or longer than a predetermined time. As used herein, the "predetermined time" refers to, for example, a time during which a person whose is typically deemed to be very drowsy continues to be in an eye-closed state, and is obtained by an experiment or the like.

If the eye-closed time is equal to or longer than the predetermined time, the determination unit 120 determines that the person is in a low-awakening state (that is, a strong-drowsiness state), with reference to a database (not shown). On the other hand, if the eye-closed time is shorter than the predetermined time, the determination unit 120 determines that the person is in a high-awakening state (that is, a weak-drowsiness state), with reference to the database (not shown). In the database, for example, information indicating that "the eye-closed time is equal to or longer than the predetermined time" and information indicating a "low-awakening state" are registered so as to be associated with each other, and information indicating that "the eye-closed time is shorter than the predetermined time" and information indicating a "high-awakening state" are registered so as to be associated with each other."

The determination unit 120 then outputs information indicating the determination result (a high-awakening state or low-awakening state) to a predetermined device (e.g., a storage device, display device, communication device).

Figure 3:
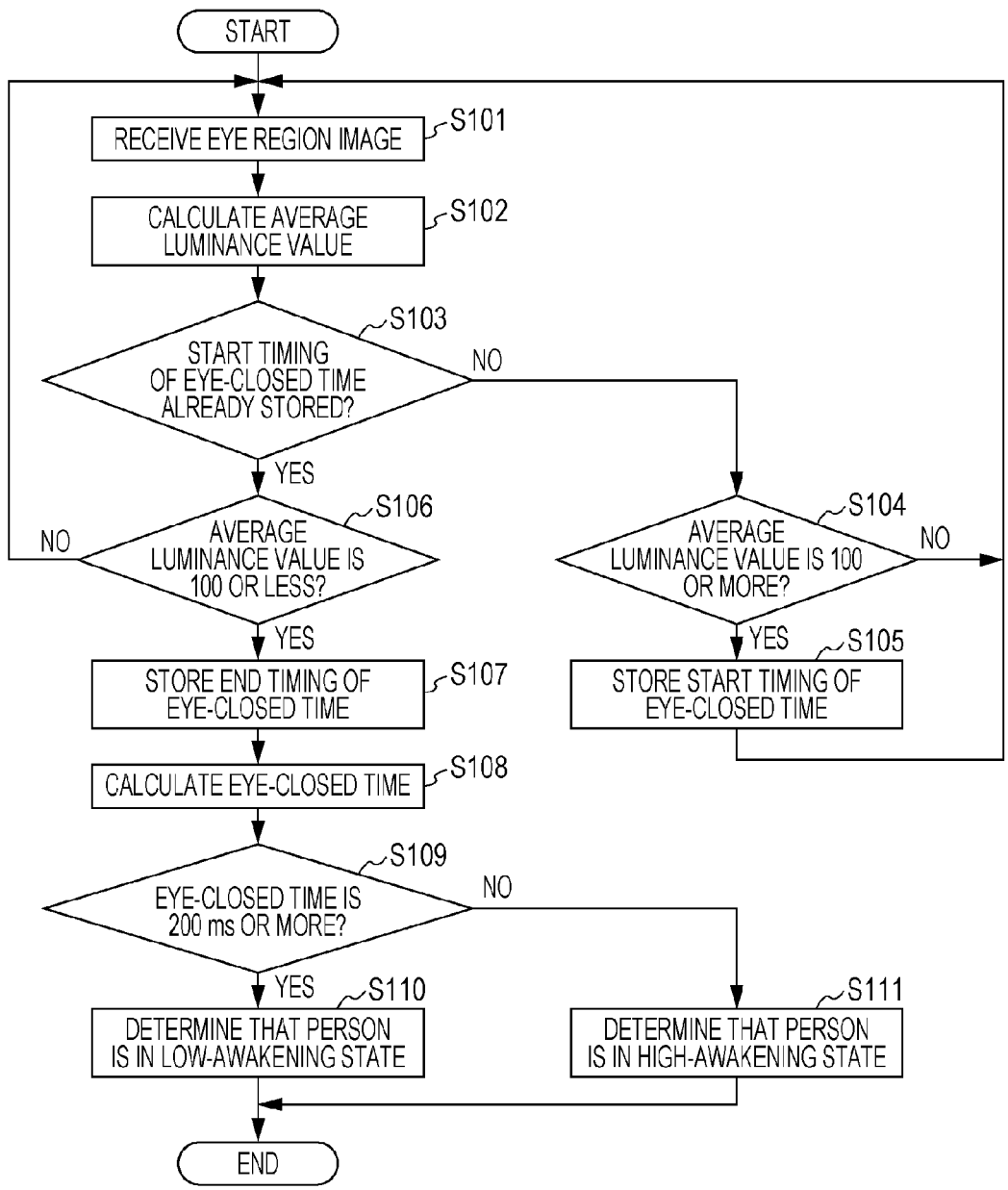
FIG. 3 is a flowchart showing an example of the operation flow of the state determination device according to the first embodiment of the present disclosure.

Next, an example of the operation of the state determination device 100 according to the first embodiment of the present disclosure will be described with reference to FIGS. 3 and 4. FIG. 3 is a flowchart showing an example of the operation flow of the state determination device 100 according to the first embodiment of the present disclosure.

The calculator 110 first receives an eye region image captured at a predetermined timing and corresponding image capture time point information from the camera 200 (step S101) and then calculates the average luminance value of the received eye region image (step S102). The calculator 110 then outputs the calculated average luminance value and corresponding image capture time point information to the determination unit 120.

The determination unit 120 receives the average luminance value and corresponding image capture time point information from the calculator 110 and determines whether the start timing of an eye-closed time has been already stored (step S103).

If the determination unit 120 determines in step S103 that the start timing has been already stored (step S103: YES), the flow proceeds to step S106. Step S106 will be described later.

If it determines in step S103 that a start timing has yet to be stored (step S103: NO), the determination unit 120 determines whether the average luminance value received from the calculator 110 is equal to or greater than 100, which is predetermined as the first luminance value (step S104).

If the determination unit 120 determines in step S104 that the average luminance value is not equal to or greater than 100 (step S104: NO), the flow returns to step S101.

If it determines in step S104 that the average luminance value is equal to or greater than 100 (step S104: YES), the determination unit 120 stores the image capture time point information corresponding to the average luminance value in the predetermined storage device as the start timing of an eye-closed time (step S105). In this way, the start timing is stored. As seen above, a timing indicated by the image capture time point information received along with the average luminance value which is equal to or greater than the first luminance value (e.g., 100) serves as the start timing of an eye-closed time. Then, the flow returns to step S101.

If it determines in step S103 that the start timing has been stored (step S103: YES), the determination unit 120 determines whether the average luminance value received from the calculator 110 is equal to or smaller than 100, which is predetermined as the second luminance value (step S106).

If the determination unit 120 determines in step S106 that the average luminance value is not equal to or smaller than 100 (step S106: NO), the flow returns to step S101.

If it determines in step S106 that the average luminance value is equal to or smaller than 100 (step S106: YES), the determination unit 120 stores the image capture time point information corresponding to the average luminance value in the predetermined storage device as the end timing of the eye-closed time (step S107). As seen above, a timing indicated by the image capture time point information received along with the average luminance value which is equal to or smaller than the second luminance value (e.g., 100) serves as the end timing of the eye-closed time.

The determination unit 120 then reads the start timing and end timing stored in the predetermined storage device and calculates the eye-closed time on the basis of these timings (step S108). As described above, the eye-closed time calculated is the difference between the start timing and end timing.

The determination unit 120 then determines whether the eye-closed time calculated is equal to or longer than a predetermined time, for example, 200 ms (step S109).

If it determines in step S109 that the eye-closed time is equal to or longer than the predetermined time (step S109: YES), the determination unit 120 determines that the person is in a low-awakening state (an example of the first state), with reference to the database (step S110).

On the other hand, if the eye-closed time is shorter than the predetermined time (step S109: NO), the determination unit 120 determines that the person is in a high-awakening state (an example of the second state), with reference to the database (step S111).

The determination unit 120 then outputs information indicating the determination result (a high-awakening state or low-awakening state) to a predetermined device (e.g., a storage device, display device, communication device).

As described above, the state determination device 100 of the present embodiment calculates the respective average luminance values of eye region images captured at difference timings; it calculates, as an eye-closed time, the time interval from the time point when the average luminance value reaches the first luminance value for the first time to the time point when the average luminance value reaches the second luminance value after that time point; if the eye-closed time is equal to or longer than the predetermined time, it determines that the person is in a low-awakening state; and if the eye-closed time is shorter than the predetermined time, it determines that the person is in a high-awakening state. That is, the state determination device 100 detects whether the eyes of the person are open or closed, using the eye-closed time and thus can accurately determine the state of the person without having to detect the edge of an eye region image.

While the first embodiment of the present disclosure has been described above, the present disclosure is not limited to the description of the first embodiment. Modifications thereof will be described below.

First Modification

In the first embodiment described above, the image capture time point indicated by the image capture time point information corresponding to the average luminance value determined to be equal to or greater than the first luminance is determined as the first time point (the start timing), and the image capture time point indicated by the image capture time point information corresponding to the average luminance value determined to be equal to or smaller than the second luminance value is determined as the second time point (the end timing). However, other time points may be determined as the first time point or second time point. For example, if it determines that an average luminance value received from the calculator 110 is equal to or greater than the first luminance value, the determination unit 120 may determine, as the first time point, an earlier image capture time point than an image capture time point indicated by image capture time point information corresponding to that average luminance value. For example, if it determines that an average luminance value received from the calculator 110 is equal to or smaller than the second luminance value, the determination unit 120 may determine, as the second time point, an earlier image capture time point than an image capture time point indicated by image capture time point information corresponding to that average luminance value. The present modification is useful when eye region images are captured at short intervals.

Second Modification

In the first embodiment described above, the image capture time point indicated by the image capture time point information corresponding to the average luminance value determined to be equal to or greater than the first luminance is determined as the first time point (the start timing), and the image capture time point indicated by the image capture time point information corresponding to the average luminance value determined to be equal to or smaller than the second luminance value is determined as the second time point (the end timing). However, the first and second time points may be determined in other approaches. For example, the determination unit 120 may generate temporal change information on the basis of an average luminance value and corresponding image capture time point information received from the calculator 110 and determine the first time point (the start timing) and the second time point (the end timing) from the temporal change information. This approach will be described below using a specific example.

Each time the determination unit 120 receives an average luminance value and corresponding image capture time point information from the calculator 110, it pairs the average luminance value and image capture time point information and stores them in a predetermined storage device. The determination unit 120 then reads all the paired average luminance values and image capture time point information stored in the predetermined storage device and generates temporal change information indicating the average luminance values corresponding to the respective image capture time points (i.e., temporal changes in average luminance value resulting from the differences among the image capture time points) on the basis of all the read pairs.

An example of the temporal change information will be described with reference to FIG. 4. FIG. 4 is a diagram showing, as an example of the temporal change information, an approximation curve C calculated on the basis of the paired average luminance values and image capture time point information. The horizontal axis of FIG. 4 represents the image capture time point, and the vertical axis thereof represents the average luminance value. In FIG. 4, MLa represents the first luminance value and second luminance value (e.g., 100), and MLb represents the maximum value.

Figure 4:
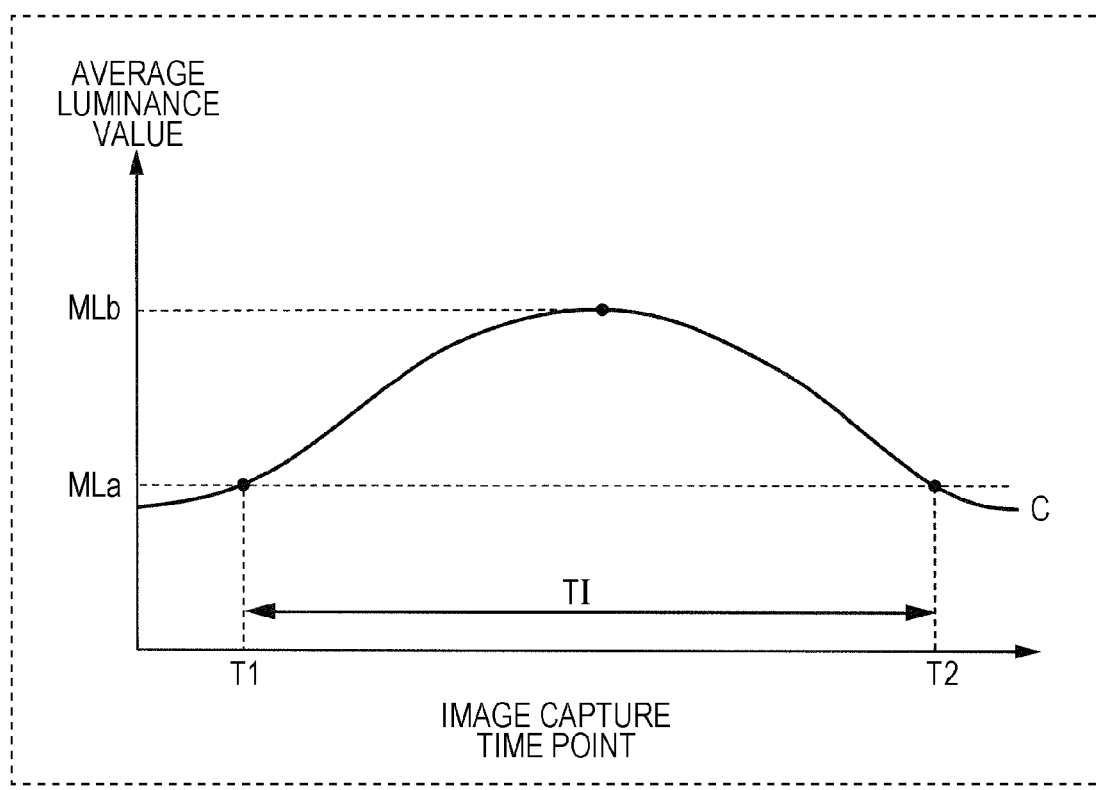
FIG. 4 is a diagram showing an example of temporal change information according to the first embodiment of the present disclosure.

After calculating the approximation curve C shown in FIG. 4, the determination unit 120 determines time point T1 and time point T2 from the intersections of the approximation curve C and MLa. Time point T1 is a time point when the average luminance value has reached MLa (an example of the first time point) for the first time. Time point T2 is a time point (an example of the second time point) when the average luminance value has reached MLa after the first time point.

The determination unit 120 then calculates the difference between time point T2 and time point T1, that is, a time interval TI, and regards the time interval TI as an eye-closed time.

Third Modification

While, in the second modification, the first and second time points are calculated on the basis of the approximation curve C shown in FIG. 4, the first and second time points may be determined on the basis of only a part of the approximation curve C. For example, the first time point (e.g., time point T1 in FIG. 4) may be determined as follows: an approximation line (approximation curve or approximation straight line) is calculated using multiple points having average luminance values close to the first luminance value (e.g., MLa in FIG. 4); and the first time point is calculated from the intersection of the approximation line and the first luminance value. Similarly, the second time point (e.g., time point T2 in FIG. 4) may be determined as follows: an approximation line (approximation curve or approximation straight line) is calculated using multiple points having average luminance values close to the second luminance value (e.g., MLa in FIG. 4); and the second time point is calculated from the intersection of the approximation line and the second luminance value.

Fourth Modification

While, in the second modification, time point T2 is a later time point than the time point when the average luminance value has reached the maximum value MLb, as shown in FIG. 4, time point T2 may be an earlier time point than the time point when the average luminance value has reached the maximum value MLb.

Fifth Modification

While, in the first embodiment, the luminance value relating to multiple pixels calculated by the calculator 110 is an average luminance value, the luminance value may be other types of values. For example, the luminance value relating to multiple pixels may be the sum of the luminances of the pixels.

Sixth Modification

While, in the first embodiment, the first luminance value used in the determination step S104 of FIG. 3 and the second luminance value used in the determination step S106 thereof are the same value, the first and second luminance values may be different values. For example, the second luminance value may be the maximum value (e.g., MLb shown in FIG. 4), and the first luminance value may be a smaller value than the maximum value. If the second luminance value is higher than the first luminance value, the determination unit 120 may determine in the determination step S106 of FIG. 3 whether the average luminance value has become equal to or smaller than the second luminance value after becoming the maximum value.

Seventh Modification

In the first embodiment, in the database, information indicating "the eye-closed time is equal to or longer than the predetermined time" and information indicating that a "low-awakening state" are registered so as to be associated with each other, and information indicating that "the eye-closed time is shorter than the predetermined time" and information indicating a "high-awakening state" are registered so as to be associated with each other. However, other types of information may be registered in the database. For example, information indicating three or more states indicating that drowsiness becomes stronger as the eye-closed time becomes longer may be registered in the database. Thus, it is possible to determine which of the three or more states the state of the person is, in accordance with the length of the eye-closed time.

Eighth Modification

While, in the first embodiment, the determination unit 120 determines the state of the person using the database, it may determine the state by other means. For example, the determination unit 120 may determine the state of the person corresponding to the eye-closed time using a learning model obtained by learning the relationship between the eye-closed time and the state of the person, a formula by which the state can be calculated from the eye-closed time, or the like.

Ninth Modification

Figure 5:
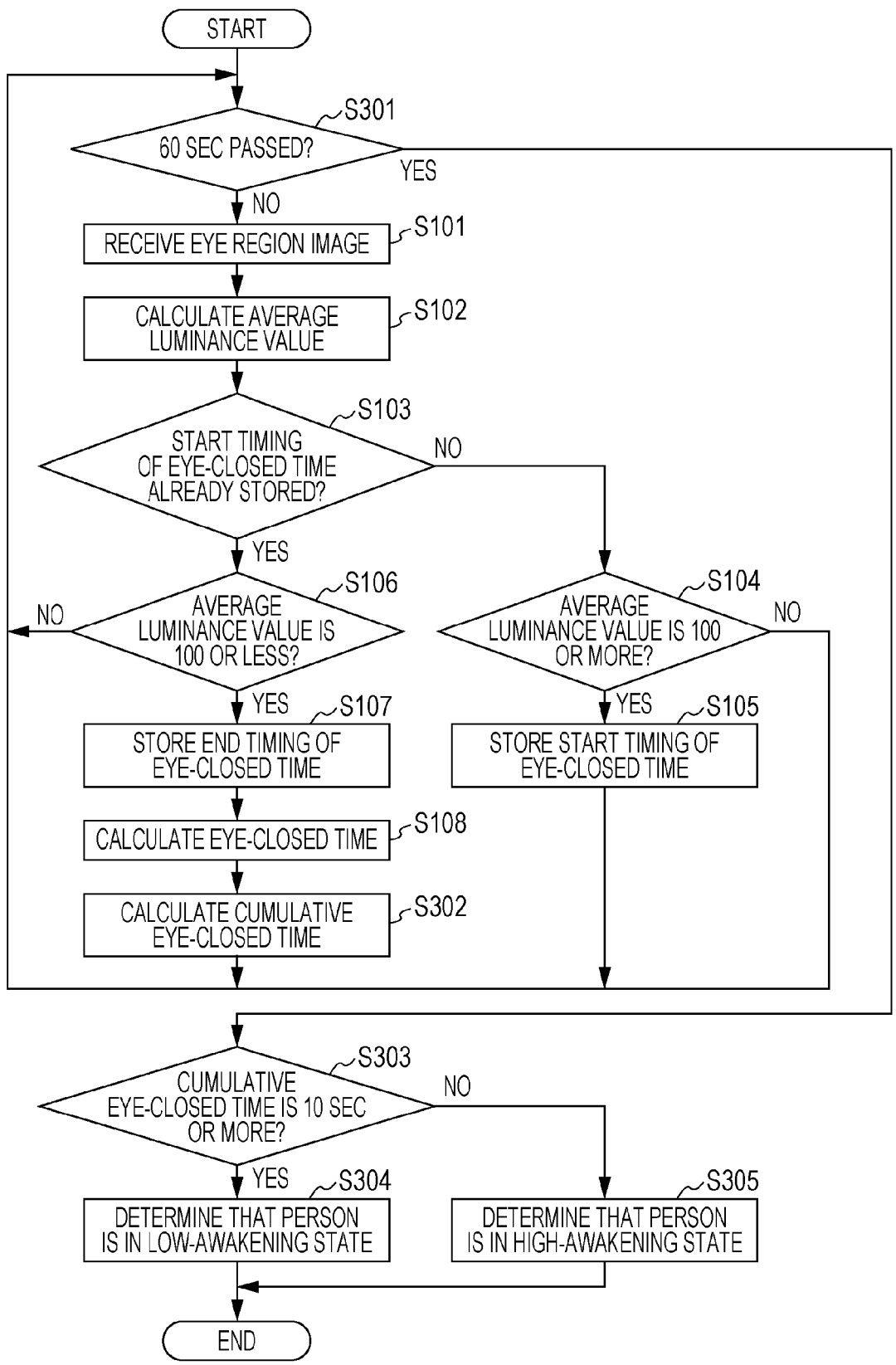
FIG. 5 is a flowchart showing an example of the operation flow of a state determination device according to a modification of the first embodiment of the present disclosure.

In the first embodiment, the state of the person may be determined using the cumulative eye-closed time. FIG. 5 shows the operation flow of the state determination device 100 of the present modification. In FIG. 5, steps identical to those in FIG. 3 are given the same reference signs. For this reason, these steps will not be described repeatedly, and steps different from those in FIG. 3 will be described below.

The determination unit 120 determines whether a predetermined time interval (e.g., 60 seconds) has passed since the time point of the start of the present process (step S301). If the predetermined time interval has passed (step S301: YES), the flow proceeds to step S303. Step S303 will be described later. On the other hand, if the predetermined time interval has not passed (step S301: NO), the flow proceeds to step S101. Steps S101 to S108 are as described with reference to FIG. 3.

After calculating an eye-closed time in step S108, the determination unit 120 calculates a cumulative eye-closed time (step S302). For example, if this calculation process is the first calculation process, the determination unit 120 stores the eye-closed time calculated in step S108, in the predetermined storage device as a cumulative eye-closed time. Thereafter, each time the determination unit 120 calculates an eye-closed time in step S108, it adds the eye-closed time to the cumulative eye-closed time stored in the predetermined storage device. Such a cumulative eye-closed time calculation process is repeated until a predetermined time interval (60 seconds) passes. As seen above, the cumulative eye-closed time is the sum of the eye-closed times within the predetermined time interval.

If the predetermined time interval has passed in step S301 (step S301: YES), the determination unit 120 determines whether the cumulative eye-closed time is equal to or greater than a predetermined value (e.g., 10 seconds) (step S303).

If the cumulative eye-closed time is equal to or greater than the predetermined value (step S303: YES), the determination unit 120 determines that the person is in a low-awakening state (i.e., a strong-drowsiness state), with reference to the database (step S304). In the database, for example, information indicating that "the cumulative eye-closed time is equal to or longer than the predetermined time" and information indicating a "low-awakening state" are registered so as to be associated with each other, and information indicating that "the cumulative eye-closed time is shorter than the predetermined time" and information indicating a "high-awakening state" are registered so as to be associated with each other.

On the other hand, if the cumulative eye-closed time is smaller than the predetermined value (step S303: NO), the determination unit 120 determines that the person is in a high-awakening state (i.e., a weak-drowsiness state), with reference to the database (step S305).

The determination unit 120 then outputs information indicating the determination result (a high-awakening state or low-awakening state) to a predetermined device (e.g., a storage device, display device, communication device).

The description of the modifications is complete.

Second Embodiment

In the first embodiment, an eye-closed time is calculated, and the state of the person is determined on the basis of the length of the eye-closed time. In the present embodiment, on the other hand, the amount of change of the luminance is calculated, and the state of the person is determined on the basis of the amount of change of the luminance. Since a state determination device of the present embodiment has the same configuration as that of the first embodiment (FIG. 1), only the operation thereof will be described below with reference to FIG. 6.

Figure 6:
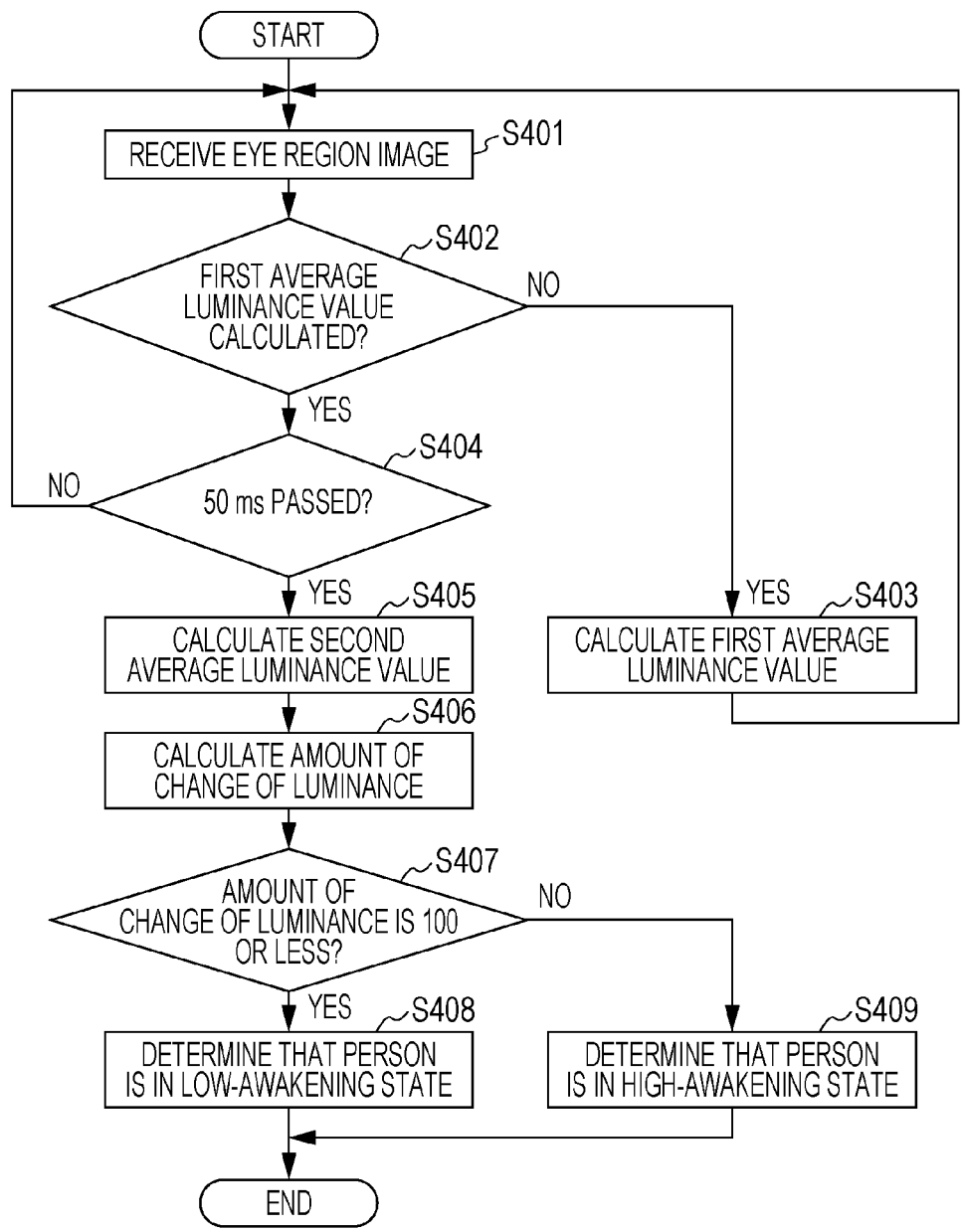
FIG. 6 is a flowchart showing an example of the operation flow of a state determination device according to a second embodiment of the present disclosure.

FIG. 6 is a flowchart showing an example of the operation flow of a state determination device 100 according to a second embodiment of the present disclosure.

First, a calculator 110 receives, from a camera 200, an eye region image captured at a predetermined image capture timing (step S401).

The calculator 110 then determines whether a first average luminance value has been calculated (step S402). A first average luminance value is, for example, the average luminance value of an eye region image first received from the camera 200.

If the calculator 110 determines in step S402 that a first average luminance value has been calculated (step S402: YES), the flow proceeds to step S404. Step S404 will be described later.

If it determines in step S402 that a first average luminance value has yet to be calculated (step S402: NO), the calculator 110 calculates a first average luminance value on the basis of the eye region image first received from the camera 200 (step S403). The method for calculating a first average luminance value is similar to that in the first embodiment.

The calculator 110 then outputs the calculated first average luminance value to a determination unit 120 and starts measuring the time. The determination unit 120 stores the first average luminance value received from the calculator 110 in a predetermined storage device. Then, the flow returns to step S401.

If it determines in step S402 that a first average luminance value has already been calculated (step S402: YES), the calculator 110 determines whether the measured time has reached a predetermined time (e.g., 50 ms) (step S404).

If the calculator 110 determines in step S404 that the measured time has yet to reach the predetermined time (step S404: NO), the flow returns to step S401.

If it determines in step S404 that the measured time has reached the predetermined time (step S404: YES), the calculator 110 calculates a second average luminance value on the basis of an eye region image received from the camera 200 (step S405). The calculator 110 then outputs the calculated second average luminance value to the determination unit 120 and ends the measurement of the time.

The determination unit 120 receives the second average luminance value from the calculator 110, reads the first average luminance value from the predetermined storage device, and calculates the difference between the first average luminance value and second average luminance value as the amount of change of the luminance (step S406).

The determination unit 120 then determines whether the calculated amount of change of the luminance is equal to or smaller than a predetermined value (e.g., 100) (step S407). The predetermined value is, for example, a value obtained by an experiment or the like.

If it determines in step S407 that the amount of change of the luminance is equal to or smaller than the predetermined value (step S407: YES), the determination unit 120 determines that the person is in a low-awakening state (an example of the first state), with reference to the database (step S408). In the database, for example, information indicating that "the amount of change of the luminance is equal to or smaller than the predetermined value" and information indicating a "low-awakening state" are associated with each other, and information indicating that "the amount of change of the luminance is greater than the predetermined value" and information indicating a "high-awakening state" are associated with each other.

On the other hand, if the amount of change of the luminance is not equal to or smaller than the predetermined value (step S407: NO), the determination unit 120 determines that the person is in a high-awakening state (an example of the second state), with reference to the database (step S409).

The determination unit 120 then outputs information indicating the determination result (a high-awakening state or low-awakening state) to a predetermined device (e.g., a storage device, display device, communication device).

As described above, the state determination device 100 of the present embodiment calculates the respective average luminance values at the first time point and last time point in the predetermined time interval; if the amount of change of the luminance, which is the difference between the calculated average luminance values, is equal to or smaller than the predetermined value, it determines that the person is in a low-awakening state; and if the amount of change of the luminance is greater than the predetermined value, it determines that the person is in a high-awakening state. That is, the state determination device 100 detects whether the eyes are open or closed, using the amount of change of the luminance. Thus, it can accurately determine the state of the person without having to detect the edge of an eye region image.

Third Embodiment

Figure 7:
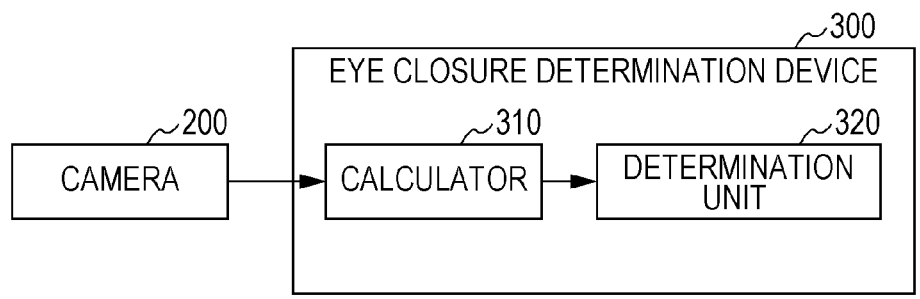
FIG. 7 is a block diagram showing an example configuration of an eye closure determination device according to a third embodiment of the present disclosure.

An example configuration of an eye closure determination device 300 according to a third embodiment of the present disclosure will be described with reference to FIG. 7. FIG. 7 is a block diagram showing an example configuration of the eye closure determination device 300 according to the third embodiment of the present disclosure.

As shown in FIG. 7, the eye closure determination device 300 is connected to a camera 200 and includes a calculator 310 and a determination unit 320. The camera 200 is as described in the first embodiment.

The calculator 310 receives an eye region image of a person captured by the camera 200 and calculates an average luminance value included in the eye region image. The calculator 310 then outputs the calculated average luminance value to the determination unit 320.

The determination unit 320 determines whether the average luminance value received from the calculator 310 is greater than a predetermined value. If the average luminance value is greater than the predetermined value, the determination unit 320 determines that the eyes of the person are closed (an eye-closed state). As used herein, the predetermined value refers to the luminance value of an eye region of a person who is typically deemed to be in an eye-closed state, and is obtained by an experiment or the like.

Figure 8:
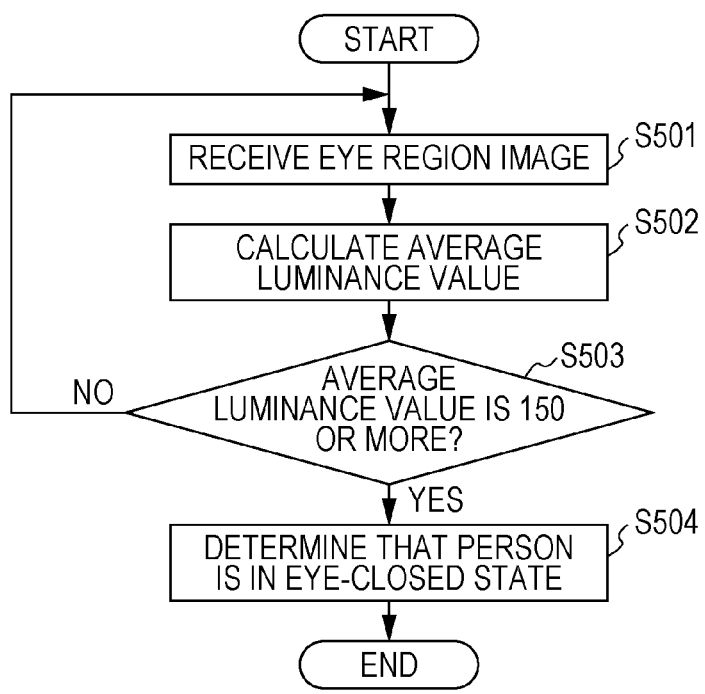
FIG. 8 is a flowchart showing an example of the operation flow of the eye closure determination device according to the third embodiment of the present disclosure.

Next, an example of the operation of the eye closure determination device 300 according to the third embodiment of the present disclosure will be described with reference to FIG. 8. FIG. 8 is a flowchart showing an example of the operation flow of the eye closure determination device 300 according to the third embodiment of the present disclosure.

First, the calculator 310 receives an eye region image captured at a predetermined timing from the camera 200 (step S501) and calculates the average luminance value of the received eye region image (step S502). The calculator 310 then outputs the calculated average luminance value to the determination unit 320.

The determination unit 320 determines whether the average luminance value received from the calculator 310 is equal to or greater than a predetermined value (e.g., 150) (step S503).

If the determination unit 320 determines in step S503 that the average luminance value is not equal to or greater than the predetermined value (step S503: NO), the flow returns to step S501.

On the other hand, if it determines in step S503 that the average luminance value is equal to or greater than the predetermined value (step S503: YES), the determination unit 320 determines that the person is in an eye-closed state (step S504). The determination unit 320 then outputs information indicating that the person is in an eye-closed state to a predetermined device (e.g., a storage device, display device, communication device).

As described above, the eye closure determination device 300 of the present embodiment calculates the average luminance value and, if the calculated average luminance value is equal to or greater than the predetermined value, determines that the person is in an eye-closed state. That is, the eye closure determination device 300 detects whether the eyes are open or closed, using the average luminance value. Thus, it can accurately determine the state of the person without having to detect the edge of an eye region image.

The description of the embodiments of the present disclosure is complete.

Figure 9:
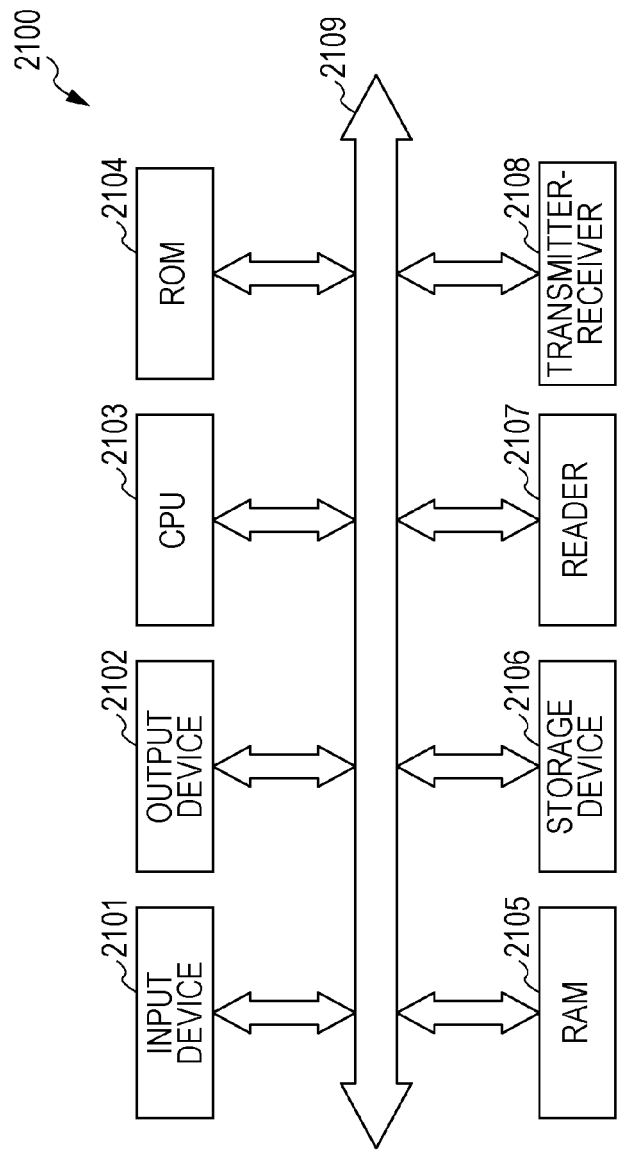
FIG. 9 is a drawing showing the hardware configuration of a computer that implements the functions of elements on the basis of a program.

FIG. 9 is a drawing showing the hardware configuration of a computer that implements the functions of the elements in the embodiments and modifications on the basis of a program.

As shown in FIG. 9, a computer 2100 includes an input device 2101 such as input buttons or touch pad, an output device 2102 such as a display or speaker, a central processing unit (CPU) 2103, a read-only memory (ROM) 2104, and a random access memory (RAM) 2105. The computer 2100 also includes a storage device 2106 such as a hard disk drive or solid state drive (SSD), a reader 2107 that reads information from a storage medium such as a digital versatile disk read-only memory (DVD-ROM) or universal serial bus (USB) memory, and a transmitter-receiver 2108 that performs communication through a network. These devices are connected together through a bus 2109.

The reader 2107 reads the program for implementing the functions of the elements from a recording medium and stores it in the storage device 2106. Alternatively, the transmitter-receiver 2108 communicates with a server connected to the network, downloads the program for implementing the functions of the elements from the server, and stores it in the storage device 2106.

The CPU 2103 copies the program stored in the storage device 2106 to the RAM 2105, and sequentially reads commands included in the program from the RAM 2105 and executes the commands. Thus, the functions of the elements are implemented. When the program is executed, information obtained in the processes described in the embodiments is stored in the RAM 2105 or storage device 2106 and used as necessary.

A state determination device, an eye closure determination device, state determination method, a state determination program, and a storage medium according to the present disclosure are useful to determine the drowsiness state of a person.

What is claimed is:

1. A state determination device comprising:
   a processor; and
   a memory that stores instructions and that when executed by the processor, causes the processor to perform operations comprising:
   receiving a plurality of eye region images captured at different timings in a time interval from when a person opening their eyes closes the eyes to when the person opens the eyes a next time and calculating a luminance value relating to a plurality of pixels included in each of the eye region images; and
   calculating a time interval from a first time point when the luminance value relating to the pixels reaches a predetermined first luminance value for the first time to a second time point when the luminance value relating to the pixels reaches a second luminance value after the first time point, wherein if a time interval from the first time point to the second time point is a first time interval, a determination is made that the person is in a first state, and if the time interval from the first time point to the second time point is a second time interval which is shorter than the first time interval, a determination is made that the person is in a second state which differs from the first state; and
   a determination result is output.

2. The state determination device according to claim 1, wherein temporal change information is generated indicating temporal changes in the luminance value relating to the pixels caused by differences between the timings and the first time point and the second time point are determined on the basis of the temporal change information.

3. The state determination device according to claim 2, wherein the temporal change information is an approximation curve calculated on the basis of the luminance value relating to the pixels and the timings.

4. The state determination device according to claim 1, wherein the luminance value relating to the pixels is a sum of luminance values of the pixels.

5. The state determination device according to claim 1, wherein the luminance value relating to the pixels is an average of luminance values of the pixels.

6. The state determination device according to claim 1, wherein the second time point is an earlier time point than a time point when the luminance value relating to the pixels reaches an extreme value.

7. The state determination device according to claim 1, wherein the second time point is a later time point than a time point when the luminance value relating to the pixels reaches an extreme value.

8. The state determination device according to claim 1, wherein the second luminance value is an extreme value of the luminance value relating to the pixels.

9. The state determination device according to claim 1, wherein the first luminance value and the second luminance value are the same value.

10. The state determination device according to claim 1, wherein a state of the person is determined with reference to a database storing information indicating that drowsiness becomes stronger as the time interval from the first time point to the second time point becomes longer.

11. The state determination device according to claim 1, wherein
    if a cumulative time of the first time interval in a predetermined time interval is equal to or greater than a predetermined value, it is determined that the person is in the first state, and
    if the cumulative time of the first time interval in the predetermined time interval is equal to or greater than the predetermined value, it is determined that the person is in the second state.

12. A state determination device comprising:
    a processor; and
    a memory that stores instructions and that when executed by the processor, causes the processor to perform operations comprising:
    receiving a first eye region image captured at a predetermined first time point in a time interval from when a person opening their eyes closes the eyes to when the person opens the eyes a next time and a second eye region image captured at a predetermined second time point which is later than the first time point in the time interval and calculates a luminance value relating to a plurality of pixels included in each of the first eye region image and the second eye region image,
    wherein if a difference between the luminance value relating to the pixels in the first eye region image and the luminance value relating to the pixels in the second eye region image is equal to or smaller than a predetermined value, it is determined that the person is in a first state, and if the difference is greater than the predetermined value, it is determined that the person is in a second state which differs from the first state.

13. A method for determining a state, comprising:
    receiving a plurality of eye region images captured at different timings in a time interval from when a person opening their eyes closes the eyes to when the person opens the eyes a next time and calculating a luminance value relating to a plurality of pixels included in each of the eye region images; and
    calculating a time interval from a first time point when the luminance value relating to the pixels reaches a predetermined first luminance value for the first time to a second time point when the luminance value relating to the pixels reaches a second luminance value after the first time point, wherein if a time interval from the first time point to the second time point is a first time interval, determining that the person is in a first state, and if the time interval from the first time point to the second time point is a second time interval which is shorter than the first time interval, determining that the person is in a second state which differs from the first state; and outputting a determination result.

14. A method for determining a state, comprising:

receiving a first eye region image captured at a predetermined first time point in a time interval from when a person opening their eyes closes the eyes to when the person opens the eyes a next time and a second eye region image captured a predetermined second time point which is later than the first time point in the time interval and calculating a luminance value relating to a plurality of pixels included in each of the first eye region image and the second eye region image, wherein if a difference between the luminance value relating to the pixels in the first eye region image and the luminance value relating to the pixels in the second eye region image is equal to or smaller than a predetermined value, determining that the person is in a first state, and if the difference is greater than the predetermined value, determining that the person is in a second state which differs from the first state.

15. A non-transitory computer-readable storage medium that stores a state determination program for determining a state of a person and that when executed, the state determination program causes a processor of the state determination device to perform:

receiving a plurality of eye region images captured at different timings in a time interval from when a person opening their eyes closes the eyes to when the person opens the eyes a next time and calculating a luminance value relating to a plurality of pixels included in each of the eye region images;

calculating a time interval from a first time point when the luminance value relating to the pixels reaches a predetermined first luminance value for the first time to a second time point when the luminance value relating to the pixels reaches a second luminance value after the first time point, wherein if a time interval from the first time point to the second time point is a first time interval, determining that the person is in a first state, and if the time interval from the first time point to the second time point is a second time interval which is shorter than the first time interval, determining that the person is in a second state which differs from the first state; and outputting a determination result.

16. A non-transitory computer-readable storage medium that stores a state determination program for determining a state of a person and that when executed, the state determination program causes a processor of the state determination device to perform:

receiving a first eye region image captured at a predetermined first time point in a time interval from when a person opening their eyes closes the eyes to when the person opens the eyes a next time and a second eye region image captured a predetermined second time point which is later than the first time point in the time interval and calculating a luminance value relating to a plurality of pixels included in each of the first eye region image and the second eye region image, wherein if a difference between the luminance value relating to the pixels in the first eye region image and the luminance value relating to the pixels in the second eye region image is equal to or smaller than a predetermined value, determining that the person is in a first state; and if the difference is greater than the predetermined value, determining that the person is in a second state which differs from the first state; and outputting a determination result.

* * * * *